Figure 1:
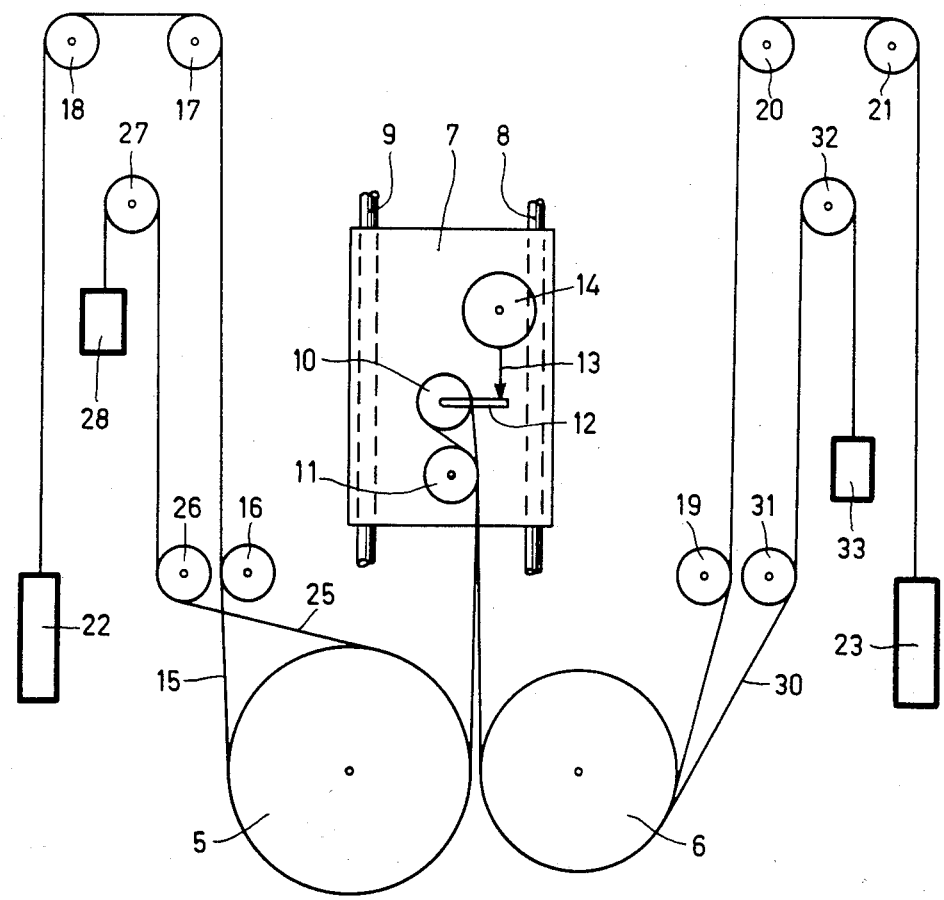

United States Patent [19]

Muller et al.

[11] Patent Number: 4,586,373
[45] Date of Patent: May 6, 1986

[54] DEVICE FOR MEASURING THE SINGLE FLANK ERROR OF A PAIR OF INTERMESHING TOOTHED WHEELS

[75] Inventors: Johannes C. A. Muller; Arnoldus R. C. Schout, both of Eindhoven, Netherlands

[73] Assignee: U.S. Philips Corporation, New York, N.Y.

[21] Appl. No.: 682,607

[22] Filed: May 7, 1984

[30] Foreign Application Priority Data

May 11, 1983 [NL] Netherlands .................. 8301682

[51] Int. Cl.⁴ .......................................... G01M 13/02
[52] U.S. Cl. ................................ 73/162; 33/179.5 R
[58] Field of Search ................. 73/162; 33/179.5 R, 33/179.5 B, 179.5 C, 179.5 E

[56] References Cited

U.S. PATENT DOCUMENTS 1,222,392 4/1917 Green et al. ........................... 73/162
2,856,770 10/1958 Palsson ................................. 73/162

FOREIGN PATENT DOCUMENTS 157090 3/1922 United Kingdom .................. 73/162
476257 12/1937 United Kingdom .................. 73/162
620123 3/1949 United Kingdom .................. 73/162

*Primary Examiner*—Charles Frankfort
*Assistant Examiner*—Patrick R. Scanlon
*Attorney, Agent, or Firm*—David R. Treacy

[57] ABSTRACT

For measuring single flank error, the toothed wheels are secured onto respective shafts, so that the toothed wheels intermesh. Each shaft has a disk on it having a diameter equal to the diameter of the respective toothed wheel, and a single length of wire or tape is wound around the first of the disks, over a measuring disk disposed on a displaceable carriage, and then around the other of the disks. Upon rotation of the toothed wheels, the carriage moves to maintain the wire or tape taut, and rotation of the measuring disk provides a measure of the single flank error.

6 Claims, 2 Drawing Figures

U.S. Patent   May 6, 1986   4,586,373

DEVICE FOR MEASURING THE SINGLE FLANK ERROR OF A PAIR OF INTERMESHING TOOTHED WHEELS

The invention relates to a device for measuring the single flank error of a pair of intermeshing toothed wheels, which device comprises two shafts, on each of which one of the toothed wheels can be secured and on each of which also a disk can be secured having a diameter corresponding to the diameter of the pitch circle of the toothed wheel on the respective shaft, a length of wire or tape being wound around each of the disks and means being provided whereby said lengths of tape or wire can be unwound from the disks under tensile force to cause rotational movement of the disks and toothed wheels and any displacement difference between the lengths is neutralized.

A device of the kind to which the present invention relates is described in GB PS No. 476257. In this known device, the toothed wheels to be measured are arranged on the two shafts and the wire or tape is unwound in opposite directions, it being ensured that either the left-hand or the right-hand flanks of the interengaging teeth of the toothed wheels constantly remain in contact with each other. The two shafts have disks secured on them which have diameters corresponding to the diameters of the pitch circles of the respective toothed wheels, whilst a length of tape is wound around each of the disks. Each of these lengths of tape is coupled at its free end to a separate carriage. The lengths of tape are unwound by subjecting the two carriages to a tensile force. When the toothed wheels do not exhibit any errors, the length of tape unwound will be the same on each of the disks so that the carriages are moved synchronously. When the toothed wheels exhibit an error, the lengths of tape unwound off will differ from one another, whilst the movements performed by the two carriages will have a relative difference which can be measured by suitable means.

A disadvantage of this known device resides in the fact that two carriages are used, which both have to be guided with great accuracy along a straight line. Each guiding error leads to an inaccuracy in measurement. The invention has for its object to provide a device for measuring the single flank winding-off error of pairs of intermeshing toothed wheels, which both has a very simple construction and yields very accurate measurement results.

The device according to the invention is characterized in that said lengths of wire or tape form parts of one wire or tape which is fixedly connected to a point on the circumference of each of the disks and is guided between these disks in a loop round a measuring disk which is mounted on a displaceable carriage, means being arranged on this carriage for measuring rotational movement of the measuring disk.

Since the wire or tape is now guided round one measuring disk, the guiding of the carriage substantially no longer influences the measurement result.

In order to ensure that the tensile stress in the wire or tape does not vary and that the wire or tape does not slip on the disks during the unwinding operation, the wire or tape preferably is wound with at least one complete turn in opposite directions around the disks and carries a weight at its free end.

In one embodiment of the invention, in order to ensure that during measurement either the left-hand or the right-hand flanks of the interengaging teeth of the toothed wheels are constantly in contact with each other, each of the disks has connected to it a further tape or wire, which further tapes or wires are wound one around each of the disks in such a manner that, when these tapes or wires are subjected to a tesile force, the desired flanks of the interengaging teeth are thereby held constantly in contact with each other. In order to ensure a constant tensile force in each of the further tapes or wires, each of these tapes or wires is provided at its free end with a weight. According to a further embodiment of the invention, the measuring disk is provided with an abutment which cooperates with the scanner of a micrometer. Thus, with very simple means a very accurate measurement result is obtained.

In order to ensure that any error in the guiding of the carriage influences the measurement result to the smallest possible extent, in a further embodiment the carriage is provided with a further roller over which one of said lengths of tape or wire is guided so that the two lengths of tape or wire are substantially in contact with each other at this area.

An embodiment of the invention will now be described more fully with reference to the drawings, in which FIG. 1 is a diagrammatic sectional front elevation of a device according to the invention taken on the line I—I in FIG. 2, which is a plan view of two toothed wheels and the two disks mounted on the shafts of the device.

Figure 2:
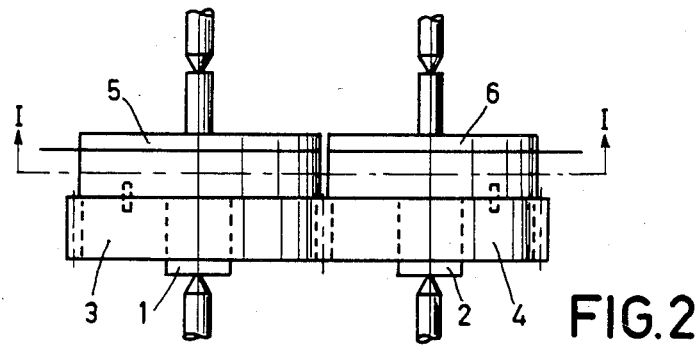

In FIGS. 1 and 2, reference numerals 1 and 2 denote two shafts which are rotatably supported in a frame (not shown). On these shafts 1 and 2 are secured a pair of intermeshing toothed wheels 3,4 and a pair of disks 5,6. The diameters of the disks 5,6 correspond to the diameters of the pitch circles of the toothed wheels 3 and 4, respectively. The device further comprises a carriage 7 which is movable on guides 8,9. On the carriage 7 are arranged a measuring disk 10 and a guide roller 11. The measuring disk 10 is provided with an abutment 12 which cooperates with a scanner 13 of a micrometer 14. A tape 15 is wound with at least one complete turn around each of the disks 5 and 6. Between these two disks, the tape 15 is guided in a loop round the measuring disk 10, the guide roller 11 guiding the two parts of the tape which form the loop in such a manner that these two parts are in close contact with each other.

On the right-hand side, as on the left-hand side, the tape is guided over the guide rollers 16, 17, 18 and 19, 20, 21, respectively. The ends of the tape 15 carry weights 22 and 23, respectively.

A further tape 25 is wound around the disk 5 in such a manner that this tape can exert a levo-rotational torque on the disk. The tape 25 is further guided over rollers 26 and 27 and carries a weight 28 at its free end. A tape 30 is wound around the disk 6 in a manner such that this tape exerts a dextro-rotational torque on the disk 6. The tape 30 is further guided over rollers 31, 32 and carries a weight 33 at its end. Thus, it is achieved that the teeth of the toothed wheels 3,4 are constantly in contact with each other at their flanks directed to one side and that the contact pressure is constant. When the error of the other flanks of the teeth has to be measured, the tapes 25 and 30 have to be wound in the reverse directions around the disks 5, 6.

In order to measure the single flank error, the carriage 7 is moved upwards as a result of which, lengths of the tape 15 are unwound from the disks 5 and 6 at the sides of the disks which are adjacent one another. When the toothed wheels do not exhibit an error, the length of tape unwound from the disk 5 is equal to the length of tape unwound from the disk 6, which means that the measuring disk 10 will not undergo a rotational movement. When the toothed wheels exhibit an error, the lengths of tape unwound from the disks 5 and 6 will differ slightly, which results in a rotational movement of the measuring disk 10 and a deflection of the abutment 12 which is recorded by the micrometer 14.

Thus, a very accurate measurement of the toothed wheels can be obtained by very simple means. Any inaccuracies in the guiding of the carriage 7 will have substantially no influence on the measurement result so that at the area of the roller 11 the lengths of tape are nearly in contact with each other so that a rotational movement of the carriage cannot influence the measurement result.

What is claimed is:

1. A device for measuring the single flank error of a pair of intermeshing toothed wheels, comprising
   two shafts, on each of which a respective one of the toothed wheels can be secured,
   a respective disk secured on each shaft, having a diameter which corresponds to the diameter of the pitch circle of the toothed wheel secured on the same shaft,
   a single length of wire or tape having two portions, each portion wound around one of said disks,
   means for unwinding a length of each said portion of wire or tape from its respective disk upon application of a tensile force causing rotational movement of the disks and toothed wheels, whereby any flank error in the toothed wheels will cause a displacement difference between said lengths of each said portion,
   a point of each said portion being fixedly connected to a point on the circumference of the respective disk,
   said unwinding means comprising a measuring disk mounted on a displaceable carriage, said wire or tape being guided in a loop around said measuring disk and between the respective disks on the two shafts, whereby said rotational movement of the disks and toothed wheels is caused by said carriage being displaced, and any displacement difference between said lengths of each said portion causes rotational movement of said measuring disk, and
   said device further comprising means arranged on said carriage for measuring said rotational movement of said measuring disk for providing an indication of flank error of the toothed wheels.

2. A device as claimed in claim 1, characterized in that said single length of wire or tape has two ends only, and is wound with at least one complete turn in opposite directions around each of the respective disks on said two shafts, and said device includes a respective weight attached at each end of said single length of wire or tape.

3. A device as claimed in claim 2, characterized by comprising a respective further wire or tape connected around each of the disks secured on said shafts, said further wires or tapes being wound around the respective disks in such a manner that, when said respective further wires or tapes are subjected to a tensile force, selected flanks of the inter-engaging teeth of the toothed wheels are thereby held constantly in contact with each other.

4. A device as claimed in claim 1, 2 or 3, characterized in that said means for measuring the rotational movement of said measuring disk comprises a micrometer mounted on said displaceable carriage, said micrometer having a scanner, and in that said measuring disk includes an abutment which engages said scanner such that the micrometer provides a reading of relative rotation of said measuring disk.

5. A device as claimed in claim 4, characterized in that said carriage comprises a further roller over which said single length of wire or tape is guided at a location between said two portions of wire, arranged such that said two portions of wire or tape are nearly in contact with each other at said further roller.

6. A device as claimed in claim 1, 2 or 3, characterized in that said carriage comprises a further roller over which said single length of wire or tape is guided at a location between said two portions of wire, arranged such that said two portions of wire or tape are nearly in contact with each other at said further roller.

* * * * *